(12) United States Patent
Fuss

(10) Patent No.: US 6,449,434 B1
(45) Date of Patent: Sep. 10, 2002

(54) LENS DISPLACEMENT OR OTHER CONTROL USING SHAPED MEMORY ALLOY DRIVER

(75) Inventor: Timothy J. Fuss, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/758,810

(22) Filed: Jan. 11, 2001

(51) Int. Cl.[7] ............................................... G03B 13/00
(52) U.S. Cl. ........................... 396/97; 396/144; 396/429
(58) Field of Search ............................. 396/85–87, 97, 396/129, 411, 429, 502, 144

(56) References Cited

U.S. PATENT DOCUMENTS

| | | |
|---|---|---|
| 3,138,082 A | 6/1964 | Schrumpf |
| 4,576,460 A | 3/1986 | Daitoku et al. |
| 4,664,493 A | 5/1987 | Takagi |
| 4,860,040 A | 8/1989 | Tamamura et al. |
| 5,185,621 A | 2/1993 | Kegechika |
| 5,279,123 A | 1/1994 | Wechsler et al. |
| 5,459,544 A | 10/1995 | Emura |
| 6,307,678 B2 * | 10/2001 | Kosaka et al. .............. 359/554 |

FOREIGN PATENT DOCUMENTS

JP 6-230457 8/1994

* cited by examiner

Primary Examiner—David M. Gray
(74) Attorney, Agent, or Firm—Roger A. Fields

(57) ABSTRACT

A lens displacing mechanism for an objective lens comprising an actuator movable to displace the objective lens, and a shaped memory alloy (abbreviated to SMA) wire which when heated contracts to a memorized shape to move the actuator to displace the objective lens, is characterized in that the SMA wire has opposite ends that are fixed in place and an intermediate movable portion between the opposite ends that directly contacts the actuator to move the actuator when the SMA wire is heated to contract.

9 Claims, 6 Drawing Sheets

US 6,449,434 B1

LENS DISPLACEMENT OR OTHER CONTROL USING SHAPED MEMORY ALLOY DRIVER

FIELD OF THE INVENTION

The invention relates generally to the field of photography, and in particular to cameras. More specifically, the invention relates to a camera in which lens displacement or other control is accomplished using a shaped memory alloy driver.

BACKGROUND OF THE INVENTION

Prior art U.S. Pat. No. 5,279,123 issued Jan. 18, 1994 mentions that shaped memory alloy (abbreviated to SMA) devices are well known in the art to undergo a martensitic (diffusionless) transition dependent upon the temperature applied to the SMA device. The SMA device when heated above its transition temperature undergoes a shape change to a memorized shape and when cooled below its transition temperature reverses the shape change from the memorized shape to an original shape. This change in shape can be used to provide mechanical work.

Often, as disclosed in prior art U.S. Pat. No. 5,459,544 issued Oct. 17, 1995, the SMA device is a fine metallic wire. When electrical current is applied to lead wires connected to opposite ends of the SMA wire, the SMA wire is heated to due to electrical resistance and it shrinks or contacts, i.e. recovers, to a memorized shape. When the electrical current is cut, the SMA wire cools to extend, i.e. deform, to an original shape. One application of the SMA wire to do mechanical work in U.S. Pat. No. 5,459,544 is a lens displacing mechanism for an objective lens, including an actuator pivotable in opposite directions to displace the objective lens in respective directions and an SMA wire which when heated contracts to its memorized shape to pivot the actuator forward to displace the objective lens forward and when cooled extends to its original shape to allow a return spring to pivot the actuator rearward to displace the objective lens rearward. The objective lens is displaced between two extreme positions, a close or near focus position and a far or infinity focus position, to change the actual distance between the lens and the film plane in a camera in order to adjust the image sharpness. Other applications of the SMA wire to do mechanical work in U.S. Pat. No. 5,459,544 include aperture adjustment, lens zooming movement, self-timer control, film winding, and shutter control.

SUMMARY OF THE INVENTION

Generally speaking, a control mechanism for use in a camera comprising an actuator movable to adjust an adjustable component in the camera, and a shaped memory alloy (abbreviated to SMA) wire which when heated contracts to a memorized shape to move the actuator to adjust the adjustable component, is characterized in that:

the SMA wire has opposite ends that are fixed in place and an intermediate movable portion between the opposite ends that directly contacts the actuator to move the actuator when the SMA wire is heated to contract. Preferably, the intermediate movable portion of the SMA wire has a longitudinal mid-point and directly contacts the actuator only substantially at the longitudinal mid point.

More specifically, a lens displacing mechanism for an objective lens comprising an actuator movable to displace the objective lens, and a shaped memory alloy (abbreviated to SMA) wire which when heated contracts to a memorized shape to move the actuator to displace the objective lens, is characterized in that:

the SMA wire has opposite ends that are fixed in place and an intermediate movable portion between the opposite ends that directly contacts the actuator to move the actuator when the SMA wire is heated to contract.

DETAILED DESCRIPTION OF THE INVENTION

The invention is disclosed as being embodied preferably in a camera with range finder coupled automatic focusing. Because the features of such a camera are generally well known, the description which follows is directed in particular only to those elements forming part of or cooperating directly with the disclosed embodiment. It is to be understood, however, that other elements may take various forms known to a person of ordinary skill in the art.

Figure 1:
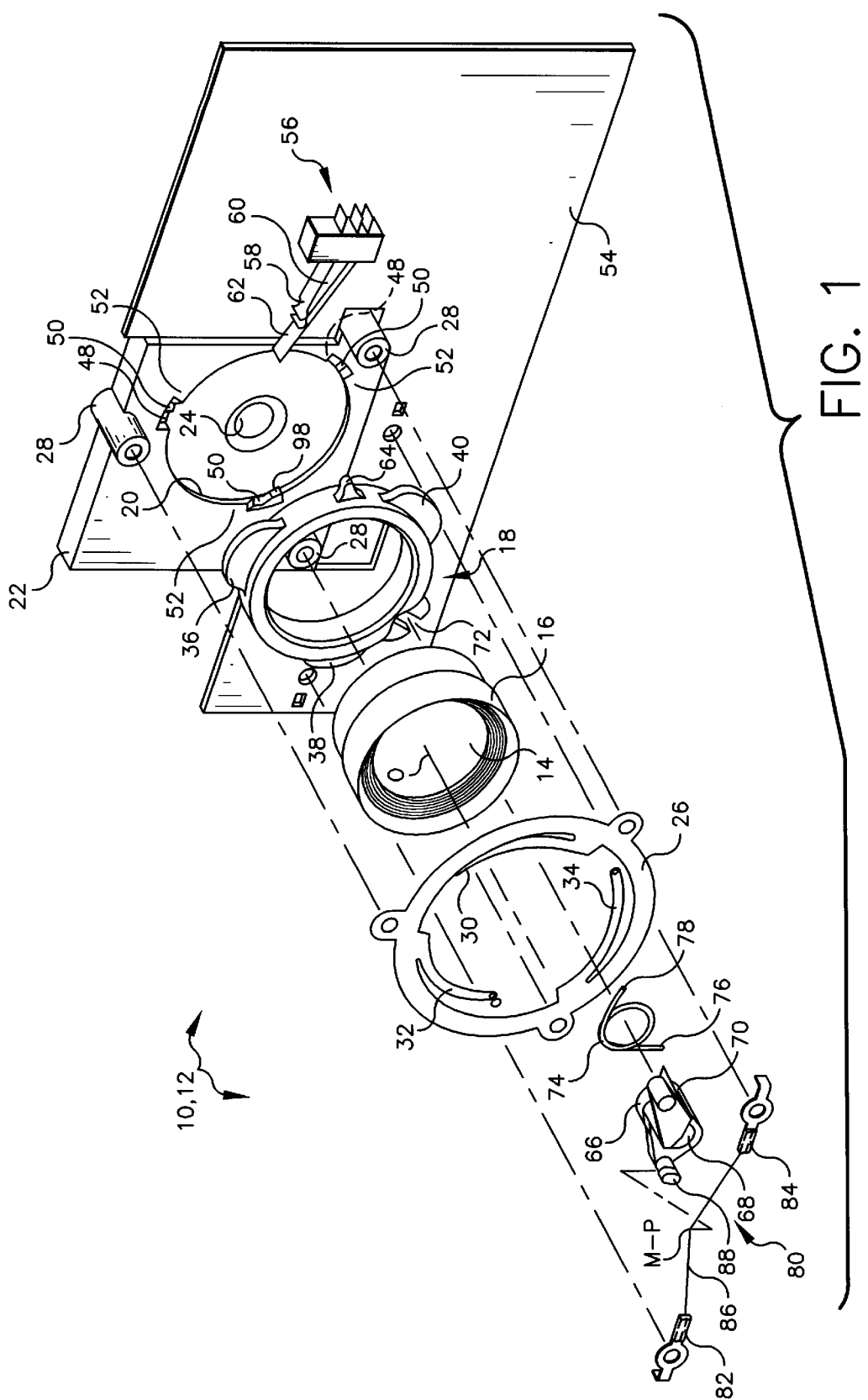
FIG. 1 is an exploded front perspective view of a lens focusing mechanism using an SMA driver in a camera, according to a preferred embodiment of the invention.
Figure 2:
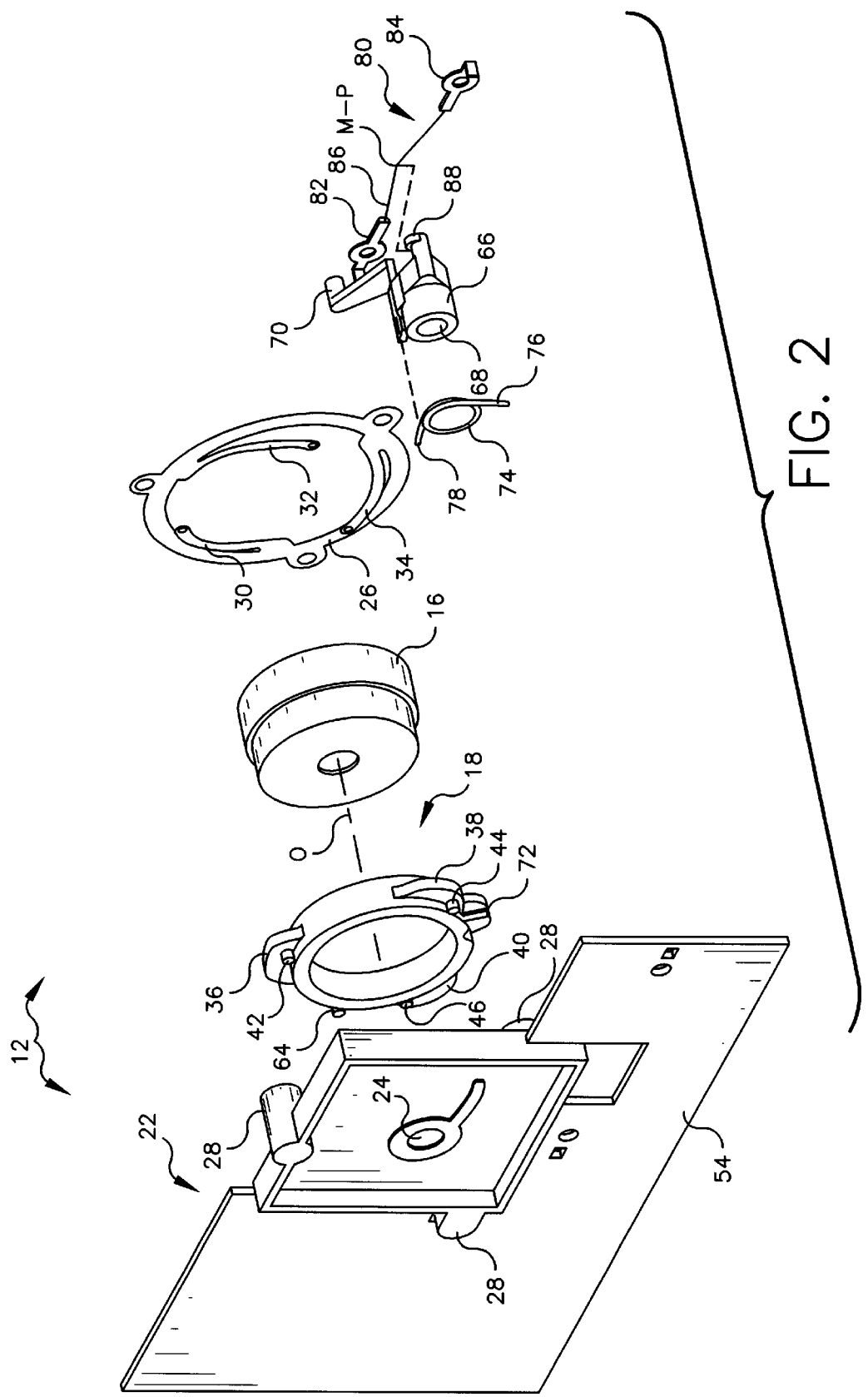
FIG. 2 is a rear exploded perspective view of the lens focusing mechanism.

Referring now to the drawings, FIGS. 1 and 2 show a camera 10 including a multi-step lens focusing (displacing) mechanism 12 for an objective lens 14 that is to be displaced relative to a film plane (not shown) in the camera at which the exposure is to be made. As is well known, the objective lens 14 is displaced in order to form a focused image of a subject on the film frame in the film plane. The objective lens 14 has an optical axis 0 and is secured within a cylindrical lens barrel 16. When the objective lens 14 is focused at infinity, light rays reflected from a very distant object point converge to a corresponding image point at a given distance behind the objective lens in the focal plane. As the camera 10 is brought nearer to the object point, the image point behind the objective lens 14 moves farther away from the objective lens. Thus, the lens-film distance must be increased to obtain a sharp image of a closer object.

As shown in FIGS. 1 and 2, the lens barrel 16 is secured within a cylindrical barrel holder 18 that is rotatable in opposite directions concentrically about the optical axis 0 of the objective lens 14, and it is translatable in opposite directions along the optical axis. The barrel holder 18 is supported for rotation and translation with the objective lens 14 within a recess 20 in a mount plate 22. The mount plate 22 has an aperture 24 for the objective lens 14 and is connected to the front of a main body part (not shown) of the camera 10. The film plane at which the exposure is to be made is formed at the rear of the main body part and is centered with respect to the aperture 24. A ring-spring retainer 26 is screwed to the mount plate 22 at three evenly-spaced support posts 28 on the mount plate. The ring-spring retainer 26 has three evenly-spaced curved cantilever spring fingers 30, 32 and 34 that bear against respective evenly-spaced cam follower tabs 36, 38 and 40 on the barrel holder 18 to urge the barrel holder and the objective lens 14 to translate toward the mount plate 22. The cam follower tabs 36, 38 and 40 have respective cam follower projections 42, 44 and 46 on their undersides that are moved over with three evenly spaced sets of low, mid and high cam steps on the mount plate 22 when the barrel holder 18 is rotated in opposite directions. Each set of the cam steps constitutes different-height low, mid and high flats 48, 50 and 52 and respective inclined cam rises that interconnect the low and mid steps and the mid and high steps. As the barrel holder 18 is rotated clockwise in FIG. 1 (and counter-clockwise in FIG. 2), the cam follower projections 42, 44 and 46 jump from the low to mid to high flats 48, 50 and 52 via the inclined cam rises to translate the barrel holder and the objective lens 14 away from the film plane, contrary to the urging of the cantilever spring fingers 30, 32 and 34 against the cam follower tabs 36, 38 and 40. Conversely, as the barrel holder 18 is rotated counter-clockwise in FIG. 1 (and clockwise in FIG. 2), the cam follower projections 42, 44 and 46 drop from the high to mid to low flats 52, 50 and 48 to translate the barrel holder toward the film plane, consistent with the urging of the cantilever spring fingers 30, 32 and 34 against the follower tabs 36, 38 and 40. Thus, the lens-film distance can be increased and decreased.

When the cam follower projections 42, 44 and 46 are on the low flats 48, the objective lens 14 is positioned relative to the film plane in a far focus zone, e.g. 15 feet to infinity, which is the minimum lens-film distance. When the cam follower projections 42, 44 and 46 are on the high flats 52, the objective lens 14 is positioned relative to the film plane in a near focus zone, e.g. 1–6 feet, which is the maximum lens-film distance. When the cam follower projections 42, 44 and 46 are on the mid flats 50, the objective lens 14 is positioned relative to the film plane in a mid focus zone, e.g. 5–20 feet, which is a mid lens-film distance.

A circuit board 54 on the front of the main body part has a multi-switch 56 that has three resilient switch fingers 58, 60 and 62. The switch fingers 58 and 60 constitute a first normally open switch 58, 60 that is closed when the switch finger 60 is flexed into contact with the switch finger 58 as in FIG. 3 and that is open when the switch finger 60 is allowed to resiliently separate from the switch finger 58 as in FIGS. 4 and 5. The switch fingers 60 and 62 constitute a second normally open switch 60, 62 that is closed when the switch finger 62 is flexed into contact with the switch finger 60 as in FIGS. 3 and 4 and that is open when the switch finger 60 is allowed to resiliently separate from the switch finger 58 as in FIG. 5. The barrel holder 18 has a switch closing member 64 that flexes the switch finger 62 into contact with the switch finger 60 to in turn flex the switch finger 60 into contact with the switch finger 58 to close the second and first switches 62, 60 and 60, 58 when the barrel holder 18 is rotated counter-clockwise from FIG. 5 to FIG. 3 to drop the cam follower projections 42, 44 and 46 from on the high flats 52 to on the low flats 48. When the barrel holder 18 is rotated clockwise from FIG. 3 to FIG. 4 to jump the cam follower projections 42, 44 and 46 from on the low flats 48 to on the mid flats 50, the switch closing member 64 allows the switch finger 60 to resiliently separate from the switch finger 58 to open the first switch 58, 60. The switch closing member 64 maintains the switch finger 62 in contact with the switch finger 60 to keep the second switch 60, 62 closed in this instance. When the barrel holder 18 is rotated clockwise from FIG. 4 to FIG. 5 to jump the cam follower projections 42, 44 and 46 from on the mid flats 50 to on the high flats 52, the switch closing member 64 allows the switch finger 62 to resiliently separate from the switch finger 60 to open the second switch 60, 62 (in addition to the first switch 58, 60 being open).

Figure 3:
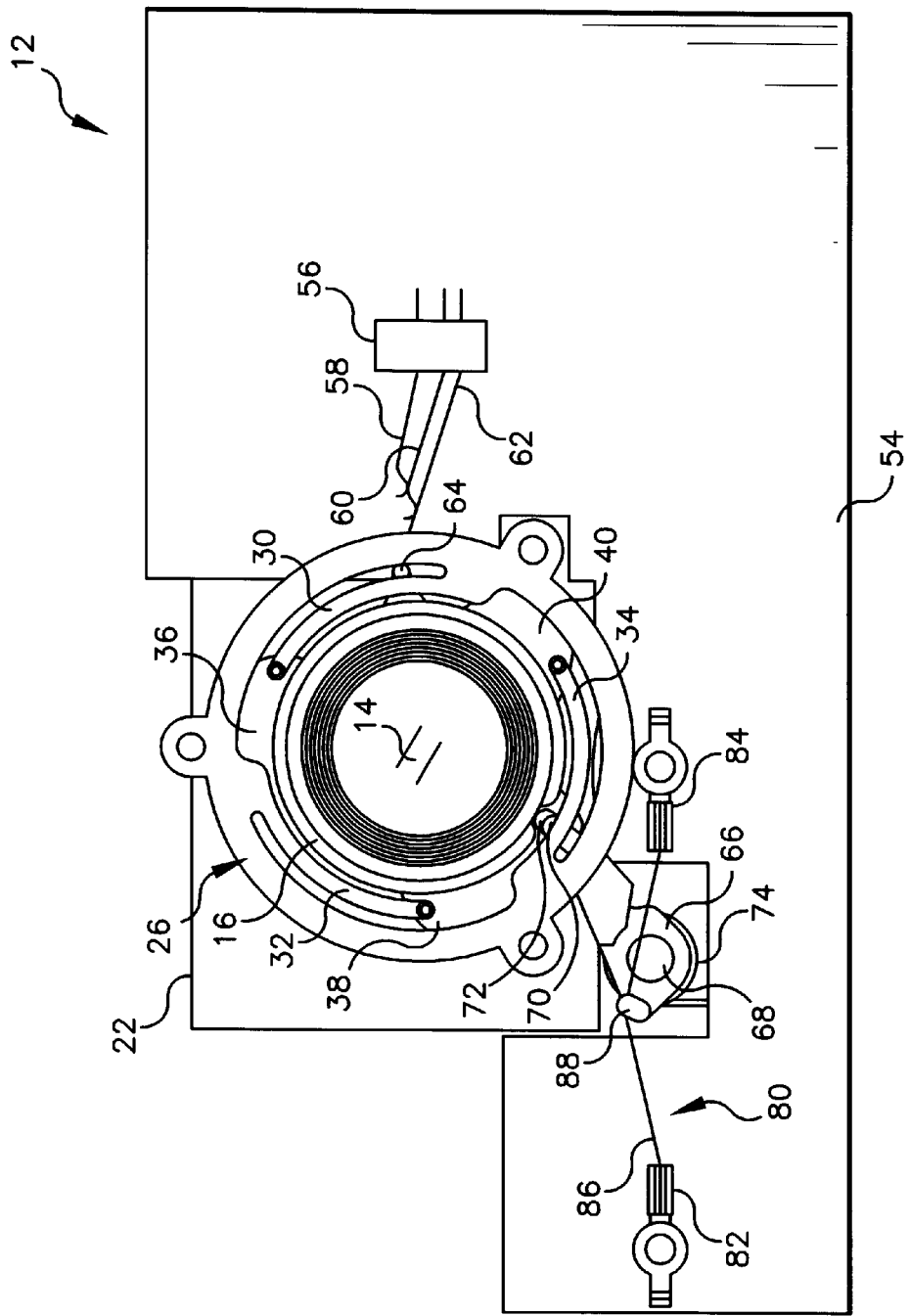
FIG. 3 is a front elevation view of the lens focusing mechanism when an objective lens is positioned in a far focus zone.

An actuator 66 has a pivot hole 68 that contains a pivot post (not shown) on the main body part to support the actuator for pivotal movement in opposite directions. A pin 70 on the actuator 66 protrudes into a slot 72 on the barrel holder 18 to rotate the barrel holder clockwise and counter-clockwise responsive to pivoting the actuator counter-clockwise and clockwise. The actuator 66 is pivoted counter-clockwise in FIG. 1 (and clockwise in FIG. 2) only enough to rotate the barrel holder 18 clockwise in FIG. 1 (and counter-clockwise in FIG. 2) to jump the cam follower projections 42,44 and 46 from the low to mid to high flats 48, 50 and 52 and is pivoted clockwise in FIG. 1 (and counterclockwise in FIG. 2) only enough to rotate the barrel holder 18 counter-clockwise in FIG. 1 (and clockwise in FIG. 2) to return the cam follower projections from the high to mid to low flats. A return spring 74 has a spring leg end 76 connected to the main body part and a spring leg end 78 connected to the actuator 66 to bias the actuator clockwise in FIG. 1 to urge the barrel holder 18 to rotate counterclockwise in FIG. 1 to return the cam follower projections 42, 44 and 46 from the high to mid to low flats 52, 50 and 48. Thus the normal or home position of the objective lens 14 is the one in which the cam follower projections 42, 44 and 46 are on the low flats 48 as shown in FIG. 3. This is the lens position in which the objective lens 14 is positioned relative to the film plane in the far focus zone, e.g. 15 feet to infinity, which is the minimum lens-film distance.

Figure 4:
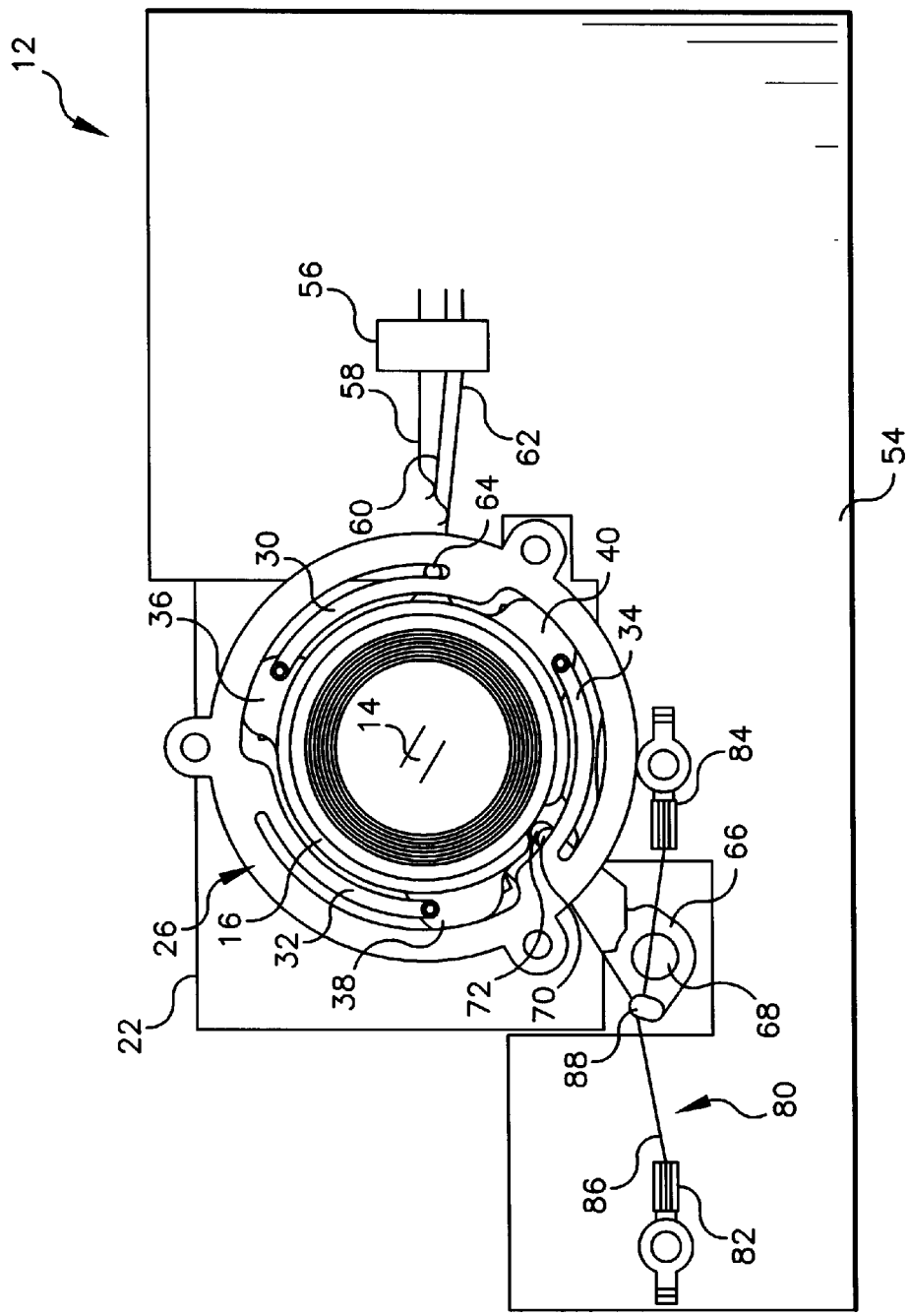
FIG. 4 is a front elevation view of the lens focusing mechanism when an objective lens is positioned in a mid focus zone.
Figure 5:
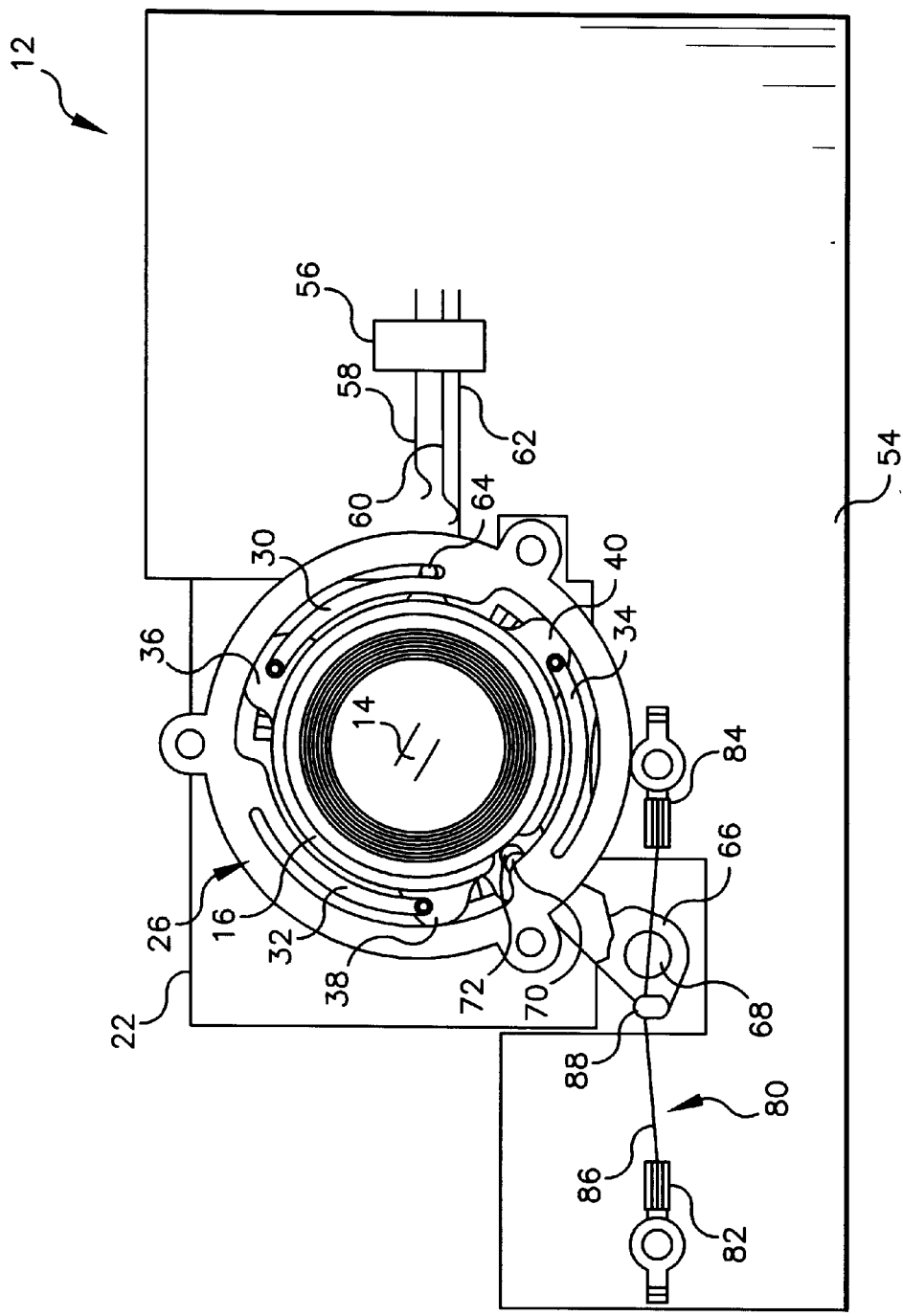
FIG. 5 is a front elevation view of the lens focusing mechanism when an objective lens is positioned in a near focus zone.

A shaped memory alloy (abbreviated to SMA) metallic wire 80 has opposite ends 82 and 84 that are fixed in place on the circuit board 54 and an intermediate movable portion 86 between the opposite ends that is hung on, i.e. extends partially around, a catch projection 88 of the actuator 66 in order to longitudinally tension the SMA wire. See FIGS. 1 and 2. As shown in FIGS. 1–5, the catch projection 88 contacts the intermediate movable portion 86 only substantially at a longitudinal mid-point M-P of the SMA wire 80. The SMA wire 80 is well known in the art to undergo a martensitic (diffusionless) transition dependent upon the temperature applied to the SMA wire. The SMA wire 80 when heated above its transition temperature undergoes a shape change to a memorized shape and when cooled below its transition temperature reverses the shape change from the memorized shape to an original shape. This change in shape can be used to provide mechanical work. As disclosed in prior art U.S. Pat. No. 5,459,544 issued Oct. 17, 1995, when electrical current is applied to the SMA wire 80, the SMA wire is heated to due to electrical resistance and it shrinks or contacts, i.e. recovers, to a memorized shape. When the electrical current is cut, the SMA wire cools to extend, i.e. deform, to an original shape. Thus, when the SMA wire shrinks or contracts due to being heated as shown in FIGS. 4 and 5, it tends to pull the actuator 66 at the catch projection 88 to pivot the actuator counter-clockwise in FIGS. 1, 4 and 5 in opposition to the bias of the return spring 74 and, when the SMA wire extends due to being cooled as in FIG. 3, it releases or eases up on the actuator at the catch projection to allow the return spring 74 to pivot the actuator counter-clockwise in FIGS. 1 and 3.

Operation

Figure 6:
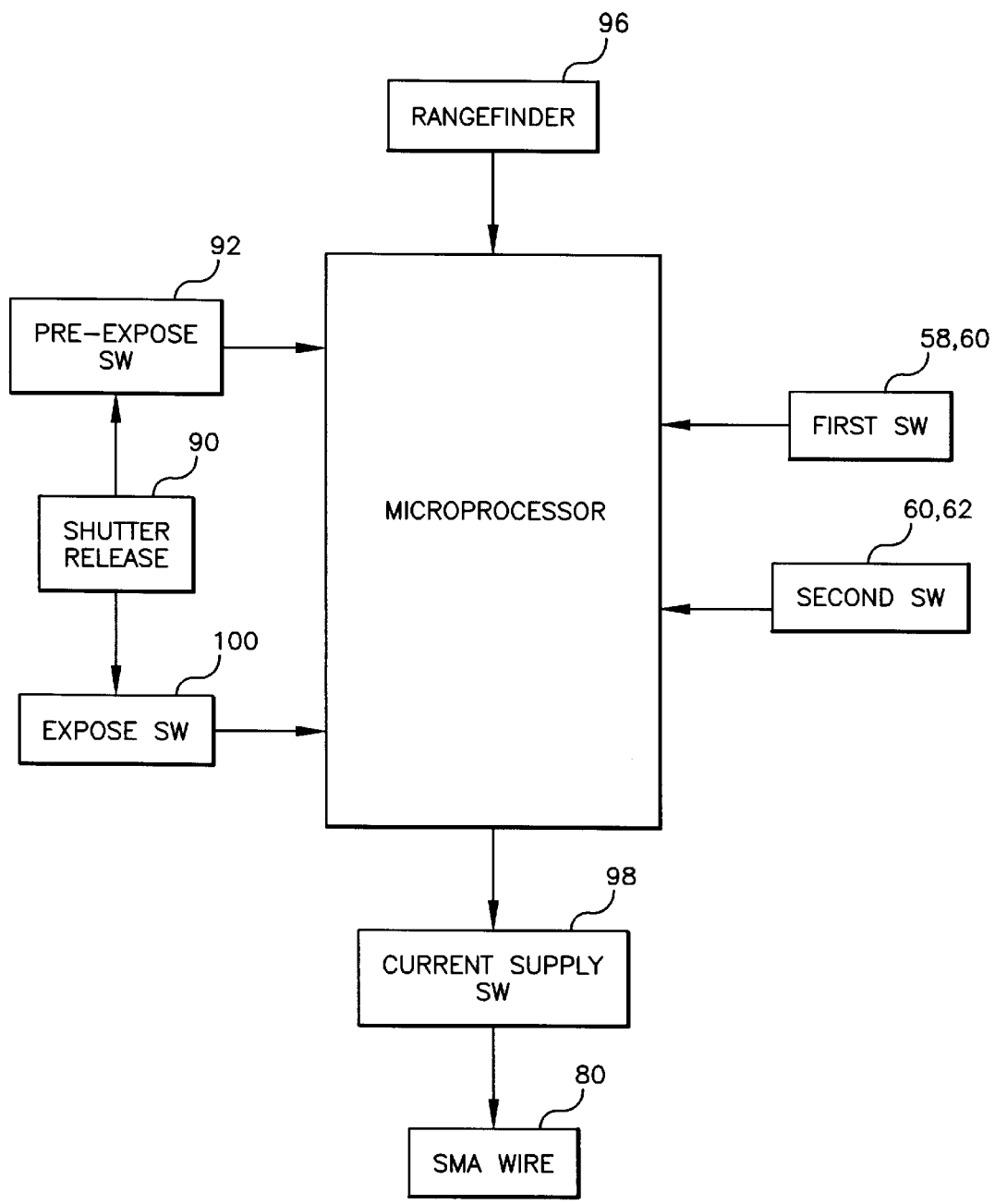
FIG. 6 is a schematic depiction of various components such as a shutter release, a microprocessor and a current supply circuit that contribute to operation of the lens focusing mechanism.

FIG. 6 shows a known manually depressible shutter release 90 that when partially depressed closes a known pre-exposure switch 92 connected to a known microprocessor 94. The microprocessor 94 then activates a known range finder 96 which makes a camera-subject distance measurement or estimation that is inputted to the microprocessor. The microprocessor 94 using the camerasubject distance measurement or estimation then determines whether the objective lens 14 should remain positioned in the far focus zone as shown in FIG. 3 or be re-positioned in the mid or near focus zone as shown in FIGS. 4 and 5.

To change the position of the objective lens 14 from being in the far focus zone as shown in FIG. 3 to being in the mid or near focus zone as shown in FIGS. 4 and 5, the microprocessor 94 activates a known current supply circuit 98 on the circuit board 54 to apply electrical current to the SMA wire 80 which is then heated to shrink or contract to pull the actuator 66 at the catch projection 88 to pivot the actuator counter-clockwise in FIGS. 4 and 5 in opposition to the bias of the return spring 74.

In FIG. 4, the barrel holder 18 is rotated clockwise to jump the cam follower projections 42, 44 and 46 from on the low flats 48 to on the mid flats 50 and for the switch closing member 64 to allow the switch finger 60 to resiliently separate from the switch finger 58 to open the first switch 58, 60. The switch closing member 64 maintains the switch finger 62 in contact with the switch finger 60 to keep the second switch 60, 62 closed. When the first switch 58, 60 is opened and the second switch 60, 62 is closed, the microprocessor 94 deactivates the current supply circuit 98 to allow the SMA wire 80 to cool to begin to extend. The return spring 74 then begins to pivot the actuator 66 clockwise in FIG. 4 to begin to rotate the barrel holder 18 counter-clockwise in FIG. 4 for the switch closing member 64 to return the switch finger 60 to contact with the switch finger 58 to re-close the first switch 58, 60. The first switch 58, 60 is closed before the cam follower projections 42, 44 and 46 can drop from being on the mid flats 50. The microprocessor 94 then re-activates the current supply circuit 98 to re-apply electrical current to the SMA wire 80 which is then heated to re-shrink or recontract to pull the actuator 66 at the catch projection 88 to begin to pivot the actuator counter-clockwise in FIG. 4, to begin to rotate the barrel holder 18 clockwise in FIG. 4 for the switch closing member 64 to allow the switch finger 60 to resiliently separate from the switch finger 58 to re-open the first switch 58, 60. This back and forth cycle maintains the objective lens 14 positioned in the mid focus zone as shown in FIG. 4, and is discontinued when the shutter release 90 is fully depressed to close an expose switch 100 connected to the microprocessor 94.

In FIG. 5, the barrel holder 18 is rotated clockwise to jump the cam follower projections 42, 44 and 46 from on the low flats 48 to on the high flats 52 and for the switch closing member 64 to allow the switch finger 60 to resiliently separate from the switch finger 58 to open the first switch 58, 60 and to allow the switch finger 62 to resiliently separate from the switch finger 60 to open the second switch 60, 62. When the first switch 58, 60 is opened and the second switch 60, 62 is opened, the microprocessor 94 deactivates the current supply circuit 98 to allow the SMA wire 80 to cool to begin to extend. The return spring 74 then begins to pivot the actuator 66 clockwise in FIG. 5 to begin to rotate the barrel holder 18 counter-clockwise in FIG. 5 for the switch closing member 64 to return the switch finger 62 to contact with the switch finger 60 to re-close the second switch 60, 62. The second switch 60, 62 is closed before the cam follower projections 42, 44 and 46 can drop from being on the high flats 52. The microprocessor 94 then re-activates the current supply circuit 98 to re-apply electrical current to the SMA wire 80 which is then heated to re-shrink or recontract to pull the actuator 66 at the catch projection 88 to begin to pivot the actuator counter-clockwise in FIG. 5, to begin to rotate the barrel holder 18 clockwise in FIG. 5 for the switch closing member 64 to allow the switch finger 62 to resiliently separate from the switch finger 60 to re-open the second switch 62, 60. This back and forth cycle maintains the objective lens 14 positioned in the near focus zone as shown in FIG. 5, and is discontinued when the shutter release 90 is fully depressed to close the expose switch 100.

The invention has been described with reference to a preferred embodiment. However, it will be appreciated that variations and modifications can be effected by a person of ordinary skill in the art without departing from the scope of the invention. For example, there can be two independently operable current supply circuits (not shown), the first one being enabled by the microprocessor 94 when the range finder 96 determines that the objective lens 14 should be positioned in the mid focus zone as shown in FIG. 4 and the second one being enabled when the range finder determines that the objective lens should be positioned in the near focus zone as shown in FIG. 5. The first current supply circuit applies electrical current to the SMA wire 80 via the first switch 58, 60 and the second switch 60, 62, when both of the switches are closed. The second current supply circuit applies electrical current to the SMA wire 80 via only the second switch 60, 62, when that switch is closed.

Instead of being used to position the objective lens 14 in far, mid and near focus zones, the relation of the actuator 66, the return spring 74 and the SMA wire 80 can be used for aperture adjustment, lens zooming movement, self-timer control, film winding, and shutter control in a camera.

PARTS LIST 10. camera
12. multi-step lens focusing (displacing) mechanism
14. objective lens
O. optical axis
16. lens barrel
18. barrel holder
20. recess
22. mount plate
24. aperture
26. ring-spring retainer
28, 28, 28. support posts
30. cantilever spring finger
32. cantilever spring finger
34. cantilever spring finger
36. cam follower tab
38. cam follower tab
40. cam follower tab
42. cam follower projection
44. cam follower projection
46. cam follower projection
48. low flat
50. mid flat
52. high flat
54. circuit board
56. multi-switch
58. switch finger
60. switch finger
62. switch finger
58, 60. first switch
60, 62. second switch
64. switch closing member
66. actuator
68. pivot hole 70. pin
72. slot
74. return spring
76. spring leg
78. spring leg
80. SMA wire
82. wire end
84. wire end
86. intermediate wire portion
M-P. longitudinal mid-point
88. catch projection
90. shutter release
92. pre-exposure switch
94. microprocessor
96. rangefinder
98. current supply circuit
100. expose switch

What is claimed is:

1. A control mechanism for use in a camera comprising an actuator movable to adjust an adjustable component in the camera, and a shaped memory alloy (abbreviated to SMA) wire which when heated contracts to a memorized shape to move said actuator to adjust the adjustable component, is characterized in that:

said SMA wire has opposite ends that are fixed in place and an intermediate movable portion between said opposite ends that directly contacts said actuator only substantially at a longitudinal mid-point of said intermediate movable portion to move said actuator when said SMA wire is heated to contract said intermediate movable portion of said SMA wire has a longitudinal mid-point and directly contacts said actuator only substantially at said longitudinal mid point.

2. A control mechanism as recited in claim 1, wherein said intermediate movable portion of said SMA wire including its longitudinal mid-point are longitudinally tensioned.

3. A lens displacing mechanism for an objective lens comprising an actuator movable to displace the objective lens, and a shaped memory alloy (abbreviated to SMA) wire which when heated contracts to a memorized shape to move said actuator to displace the objective lens, is characterized in that:

said SMA wire has opposite ends that are fixed in place and an intermediate movable portion between said opposite ends that directly contacts said actuator to move said actuator when said SMA wire is heated to contract;

a holder for the objective lens is supported for rotation about an optical axis of the objective lens and for displacement along the optical axis in response to rotation of said holder; and said actuator engages said holder to rotate said holder when said actuator is moved via said SMA wire.

4. A lens displacing mechanism for an objective lens comprising an actuator movable in different directions to displace the objective lens in respective directions, and a shaped memory alloy (abbreviated to SMA) wire which when heated contracts to a memorized shape to move said actuator in one direction to displace the objective lens in one direction and when cooled extends to an original shape to allow said actuator to be moved in another direction to permit the objective lens to be moved in another direction, is characterized in that:

said actuator has a catch projection; and said SMA wire has opposite ends that are fixed in place and an intermediate movable portion between said opposite ends that is hung on said catch projection to be able to pull said actuator at said catch projection in one direction when said SMA wire is heated to contract and to ease up on said actuator at said catch projection when said SMA wire is cooled to extend.

5. A lens displacing mechanism as recited in claim 4, wherein said catch projection of said actuator contacts said intermediate movable portion of said SMA wire at a longitudinal mid-point of said SMA wire.

6. A lens displacing mechanism for an objective lens comprising an actuator movable in different directions to displace the objective lens in respective directions, and a shaped memory alloy (abbreviated to SMA) wire which when heated contracts to a memorized shape to move said actuator in one direction to displace the objective lens in one direction and when cooled extends to an original shape to allow said actuator to be moved in another direction to permit the objective lens to be moved in another direction, is characterized in that:

said SMA wire has opposite ends that are fixed in place and an intermediate movable portion between said opposite ends that directly contacts said actuator to pull said actuator in one direction when said SMA wire is heated to contract and to release said actuator when said SMA wire is cooled to extend;

a holder for the objective lens is supported for rotation about an optical axis of the objective lens and for displacement along the optical axis in response to rotation of said holder; and said actuator engages said holder to rotate said holder when said actuator is moved via said SMA wire.

7. A lens displacing mechanism as recited in claim 6, wherein a series of different-height steps support said holder displaced to respective positions along the optical axis of the objective lens.

8. A lens displacing mechanism as recited in claim 7, wherein a spring retainer urges said holder against any one of said steps that is supporting said holder in one of its positions along the optical axis of the objective lens.

9. A lens displacing mechanism as recited in claim 6, wherein a series of different-height steps support said holder displaced to respective near focus, mid focus and far focus positions along the optical axis of the objective lens.

* * * * *